United States Patent
Javaid et al.

(10) Patent No.: US 11,556,821 B2
(45) Date of Patent: Jan. 17, 2023

(54) INTELLIGENT FRAMEWORK UPDATER TO INCORPORATE FRAMEWORK CHANGES INTO DATA ANALYSIS MODELS

(71) Applicant: International Business Machines Corporation, Armonk, NY (US)

(72) Inventors: Azka Javaid, Brooklyn, NY (US); Paul R. Bastide, Ashland, MA (US); Jayanth Krishnan, Cambridge, MA (US); Fang Lu, Billerica, MA (US)

(73) Assignee: International Business Machines Corporation, Armonk, NY (US)

( * ) Notice: Subject to any disclaimer, the term of this patent is extended or adjusted under 35 U.S.C. 154(b) by 740 days.

(21) Appl. No.: 16/573,092

(22) Filed: Sep. 17, 2019

(65) Prior Publication Data

US 2021/0081826 A1    Mar. 18, 2021

(51) Int. Cl.
  *G06F 9/445*   (2018.01)
  *G06F 21/62*   (2013.01)
  (Continued)

(52) U.S. Cl.
  CPC .............. *G06N 5/045* (2013.01); *G06F 8/61* (2013.01); *G06F 17/18* (2013.01); *G06N 7/005* (2013.01)

(58) Field of Classification Search
  CPC .......... G06N 5/045; G06N 7/005; G06F 8/61; G06F 17/18; G06F 8/75; G06F 16/113;
  (Continued)

(56) References Cited

U.S. PATENT DOCUMENTS 9,098,617 B1   8/2015   Pauley, Jr. et al.
9,218,179 B2   12/2015  Huff, II et al.
(Continued)

FOREIGN PATENT DOCUMENTS

| CN | 105893522 A | 8/2016 |
| CN | 108121780 A | 6/2018 |
| WO | 02/073521 A2 | 9/2002 |

OTHER PUBLICATIONS

Sharma et al., Implementation of trust model on CloudSim based on service parametric model, 6 pages (Year: 2015).*
(Continued)

*Primary Examiner* — Thuy Dao
(74) *Attorney, Agent, or Firm* — Edell, Shapiro & Finnan, LLC (57) ABSTRACT

A computer system adapts a model analyzing data. Information sources are analyzed to determine one or more changes for a computerized model employed for analyzing data. One or more current projects each using an implementation of the computerized model with at least one of the determined changes are identified. The implementations are compared to the employed computerized model to determine differences. One or more adaptations for the employed computerized model are determined in response to the determined differences satisfying a threshold, wherein the one or more adaptations for the employed computerized model are based on the determined changes in the corresponding implementation of the computerized model. At least one adaption is installed into a platform hosting the employed model for modification of the employed model. Embodiments of the present invention further include a method and program product for adapting a model analyzing data in substantially the same manner described above.

17 Claims, 5 Drawing Sheets

(51) Int. Cl.
    *G06F 9/455*      (2018.01)
    *G06N 20/00*      (2019.01)
    *G06N 5/04*      (2006.01)
    *G06N 7/00*      (2006.01)
    *G06F 17/18*      (2006.01)
    *G06F 8/61*      (2018.01)

(58) Field of Classification Search
    CPC ... G06F 8/60; G06F 9/541; G06F 3/06; G06F 3/0631; G06F 3/0689; G06F 9/50; G06F 3/0605; G06Q 40/08
    See application file for complete search history.

(56) References Cited

U.S. PATENT DOCUMENTS

| | | | |
|---|---|---|---|
| 9,710,767 B1 | 7/2017 | Dietrich et al. | |
| 9,805,111 B2 | 10/2017 | Hjelm et al. | |
| 10,769,291 B2* | 9/2020 | Osotio | G06F 21/6218 |
| 2007/0150322 A1 | 6/2007 | Falchuk et al. | |
| 2013/0311468 A1 | 11/2013 | Hjelm et al. | |
| 2017/0177309 A1 | 6/2017 | Bar-Or et al. | |
| 2019/0340265 A1* | 11/2019 | Raman | H04L 67/1034 |

OTHER PUBLICATIONS

Hoyt, Robert Eugene et al. "IBM Watson Analytics: Automating Visualization, Descriptive, and Predictive Statistics." JMIR public health and surveillance vol. 2,2 e157. Oct. 11, 2016, doi:10.2196/publichealth.5810.

* cited by examiner

INTELLIGENT FRAMEWORK UPDATER TO INCORPORATE FRAMEWORK CHANGES INTO DATA ANALYSIS MODELS

BACKGROUND

1. Technical Field

Present invention embodiments relate to an intelligent framework updater for data analysis models, and more specifically, to an intelligent framework updater that incorporates framework changes into data analysis models.

2. Discussion of the Related Art

Data science platforms enable data scientists to train and maintain data analysis models that can be used to answer complex problems. Model performance can be improved in a variety of manners, such as by tuning a model's hyperparameters to optimize the model. However, existing frameworks of data analysis models may not encourage changes to the framework itself.

SUMMARY

According to one embodiment of the present invention, a computer system adapts a model analyzing data. Information sources are analyzed to determine one or more changes for a computerized model employed for analyzing data. One or more current projects each using an implementation of the computerized model with at least one of the determined changes are identified. The implementations are compared to the employed computerized model to determine differences. One or more adaptations for the employed computerized model are determined in response to the determined differences satisfying a threshold, wherein the one or more adaptations for the employed computerized model are based on the determined changes in the corresponding implementation of the computerized model. At least one adaption is installed into a platform hosting the employed computerized model for modification of the employed computerized model. Embodiments of the present invention further include a method and program product for adapting a model analyzing data in substantially the same manner described above.

BRIEF DESCRIPTION OF THE DRAWINGS

Generally, like reference numerals in the various figures are utilized to designate like components.

DETAILED DESCRIPTION

Present invention embodiments relate to an intelligent framework updater for data analysis models, and more specifically, to an intelligent framework update that incorporates framework changes into data analysis models. Generally, a data analysis model is an application of a specific technique, and a framework can include one or more models. Frameworks, such as Tensorflow, that are used to develop data analysis models may not encourage updates to parts of the framework, such as updates to aspects of particular data analysis models included in the framework. For example, a Poisson model may have a critical update that enables the model to properly support compound relationships. In conventional approaches, a data scientist may tend to remain with the same model with which he or she has been working, not considering the need for updates.

Present invention embodiments provide useful updates to data models by analyzing information sources to find changes for models. When a change is identified for a model employed by a user, other models having the change may be identified, and these identified models may be compared to the user's employed model to identify adaptations that can be incorporated into the employed model. For example, a user who is implementing a model to analyze financial claims may use a simple Poisson model. Present invention embodiments may determine that the user's model does not account for overdispersion in the user's data set, and suggest a modification of the Poisson model, such as the Conway-Maxwell-Poisson distribution, to the user.

In particular, changes for a model can be identified by selecting trusted information sources that document relevant changes, and monitoring varying adaptations of an existing model for changes. Information sources may be associated with particular trust levels, enabling different tenants in a multi-tenant environment to have different trust preferences. Moreover, when a source's reputation changes, a model can be recalculated. Adaptations for an employed model may be compared to the employed model itself to identify any changes, and recommendations may be presented to a user via a user interface. In some embodiments, employed models are automatically updated to incorporate changes when specified conditions are satisfied.

Thus, present invention embodiments provide an intelligent framework updater to ensure that data analysis models utilize updated and relevant techniques, thereby improving computational speed and/or efficiency of data processing. Using adapted models, computing devices may analyze data more quickly, may analyze data in a manner that utilizes less processing, memory, and/or storage resources, or may perform data analysis to produce new or previously-unsupported results.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of embodiments of the invention as set forth hereinafter.

Figure 1:
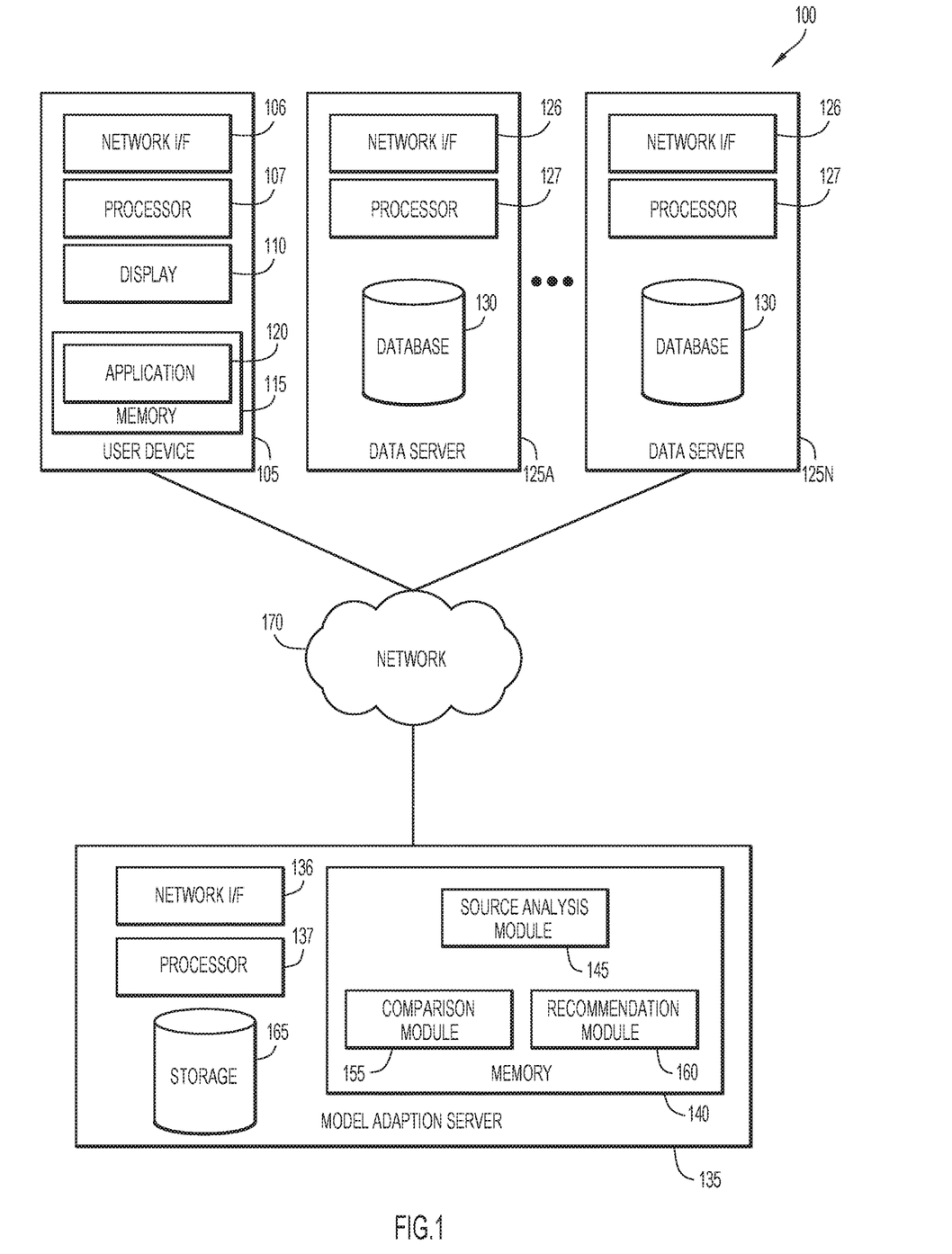
FIG. 1 is a block diagram depicting a computing environment for an intelligent framework updater in accordance with an embodiment of the present invention.

Present invention embodiments will now be described in detail with reference to the Figures. FIG. 1 is a block diagram depicting a computing environment 100 for an intelligent framework updater in accordance with an embodiment of the present invention. As depicted, computing environment 100 includes a user device 105, one or more data servers 125A-125N, a model adaptation server 135, and a network 170. It is to be understood that the functional division among components of computing environment 100 have been chosen for purposes of explaining present invention embodiments and is not to be construed as a limiting example.

User device 105 includes a network interface (I/F) 106, at least one processor 107, a display 110, and memory 115. Memory 115 may include application 120. User device 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of user device 105 to send and receive data over a network, such as network 170. Users of user device 105 may include patients and/or health care professionals. User device 105 may include internal and external hardware components, as depicted and described in further detail with respect to FIG. 5.

Display 110 may include any electronic device capable of presenting information in a visual form. For example, display 110 may be a liquid crystal display (LCD), a cathode ray tube (CRT) display, a light-emitting diode (LED) display, an electronic ink display, and the like. Information relating to data analysis models may be displayed to a user of user device 105 via display 110, including information such as results of analyzed data, information about data models, proposed model adaptations and modifications to models, and the like.

Application 120 may include one or more modules or units to perform various functions of present invention embodiments described below. Application 120 may be implemented by any combination of any quantity of software and/or hardware modules or units, and may reside within memory 115 of user device 105 for execution by a processor, such as processor 107.

Application 120 may enable a user of user device 105 to input and receive data related to adapting data analysis models. Using application 120, a user of user device 105 may provide or otherwise indicate data for processing using a data analysis model, a user may select one or more data analysis models for processing data, and/or a user may modify data analysis models. Application 120 may present a user interface to display 110 that enables a user to interact with data analysis models. The user interface of application 120 may provide recommendations to a user of adaptations or other changes to data processing models. For example, application 120 may present to a user a recommendation to update to a newer version of a model, to revert to an older version of a model, to use a modified or different algorithm for a portion of a model, and the like.

Data servers 125A-125N each include a network interface 126, at least one processor 127, and at least one database 130. In various embodiments of the present invention, data servers 125A-125N may each include a laptop computer, a tablet computer, a netbook computer, a personal computer (PC), a desktop computer, a personal digital assistant (PDA), a smart phone, or any programmable electronic device capable of executing computer readable program instructions. Network interface 126 enables components of each data server 125A-125N to send and receive data over a network, such as network 170. In an embodiment, one or more servers of data servers 125A-125N act as information sources that store data relating to models for analyzing data, as well as other data from which recommendations for adapting models can be extracted. For example, data servers 125A-125N may store research publications, open-source projects, webinars, presentations and slideshows, blog posts, social media posts, and the like. In some embodiments, one or more servers of data servers 125A-125N are associated with social media websites. In some embodiments, one or more servers of data servers 125A-125N are associated with software development version control systems, such as Git.

Database 130 may include any non-volatile storage media known in the art. For example, database 130 can be implemented with a tape library, optical library, one or more independent hard disk drives, or multiple hard disk drives in a redundant array of independent disks (RAID). Similarly, data on database 130 may conform to any suitable storage architecture known in the art, such as a file, a relational database, an object-oriented database, and/or one or more tables. In some embodiments, database 130 may store data including data analysis models, modifications to models (e.g., variations or different versions of models), model metadata, and/or comments and documentation for models, which may be found in research publications, open-source projects, webinars, presentations and slideshows, blog posts, social media posts, and the like.

Model adaptation server 135 includes a network interface 136, at least one processor 137, memory 140, and storage 165. Memory 140 includes a source analysis module 145, a comparison module 155, and a recommendation module 160. In various embodiments of the present invention, model adaptation server 135 may include a laptop computer, a tablet computer, a netbook computer, a personal computer (PC), a desktop computer, a personal digital assistant (PDA), a smart phone, or any programmable electronic device capable of executing computer readable program instructions. Network interface 136 enables components of model adaptation server 135 to send and receive data over a network, such as network 170. In general, model adaptation server 135 and its modules may analyze information sources, such as data servers 125A-125N, to identify other data analysis models that are relevant to a user's data analysis goals in order to recommend changes to the user's own data analysis model. Model adaptation server 135 may include internal and external hardware components, as depicted and described in further detail with respect to FIG. 5.

Source analysis module 145, comparison module 155, and recommendation module 160 may include one or more modules or units to perform various functions of present invention embodiments described below. Source analysis module 145, comparison module 155, and recommendation module 160 may be implemented by any combination of any quantity of software and/or hardware modules or units, and may reside within memory 140 of model adaptation server 135 for execution by a processor, such as processor 137.

Source analysis module 145 may analyze trusted information sources to determine changes for a computerized model employed for analyzing data. The employed model, including a workflow for the model, may be obtained from a user device, such as user device 105, or may be stored in storage 165 of model adaptation server 135. Source analysis module 145 may first analyze a workflow of an employed model to identify keywords in the model's code and/or documentation. Keywords may be obtained from a current model implementation and the context of a model's application or problem being solved. For example, source analysis module 145 may analyze a framework for a financial data analysis model to identify a set of keywords relating to the field of finance; source analysis module 145 may analyze other frameworks to identify keywords relating to applications such as insurance claim analysis, vehicular traffic flow modeling, cellular networking, gene expression, and the like. In some embodiments, source analysis module 145 identifies keywords using conventional or other natural language processing techniques. Source analysis module 145 may employ techniques such as sentiment analysis to select which words found in a current model's framework should be identified as keywords.

Source analysis module 145 uses identified keywords as query terms to search trusted information sources for changes for an employed data analysis model. Trusted information sources may include one or more of servers 125A-125N, and trust may be based on a reputation of an information source. In some embodiments, the reputation of an information source is predetermined. For example, each user or tenant may establish a whitelist (or blacklist) of trusted (or untrusted) information sources. In some embodiments, source analysis module 145 determines a trust level for an information source according to user reviews of the information source, which can be compared to a threshold value. For example, if an average user review of a particular source is four out of five stars, and the threshold trust level is three out of five stars, source analysis module 145 may determine that the information source has a satisfactory trust level. Using the query terms, source analysis module 145 analyzes trusted information sources to determine change for a data analysis model, which can include particular modifications to the model, different versions of the model, and the like.

When source analysis module 145 determines a change for a model, source analysis module 145 identifies other current projects that utilize implementations of the employed model that also include the determined change. Source analysis module 145 may search the information sources in which changes were identified by source analysis module 145 to extract other current projects that use those changes, which may include other models for data analysis. In some embodiments, the information sources are queried for relevant source code that implements each adaptation. For example, when source analysis module 145 identifies a change in an information source that is a research publication, source analysis module 145 may search the rest of the research publication to identify one or more other data analysis models that implement the employed model as well as the identified change. Each implementation may be traced over time by monitoring the implementation's commit history.

Source analysis module 145 may obtain identified projects that use implementations of an employed model and store the projects to storage 165 of model adaptation server 135. When source analysis module 145 extracts an identified project, source analysis module 145 may extract code for the project's data analysis model, documentation information, version information, and any other data in the information source that is relevant to the identified project.

Comparison module 155 compares implementations of an employed model to the employed model itself to identify differences between the models. Comparison module 155 may perform a comparison operation that identifies the degree to which compared models vary. By comparing source code of one model to source code of another, comparison module 155 may compute a difference value, such as a percentage difference, between the models. In some embodiments, comparison module 155 compares models based on one or more of: the functions or routines that are called, the order and/or nature of operations performed, and the like. Comparison module 155 may also determine whether variations between models are substantive differences or not. For example, when models assign different names for variables, functions, etc., that are otherwise functionally identical, such variations may not be considered to be substantive differences. In some embodiments, only substantive differences between models counts toward the computed difference value in the models.

Recommendation module 160 may generate adaptations for an employed data analysis model based on differences between the employed data analysis model and other models that are identified by comparison module 155. Adaptations for an employed data analysis model may then be presented to a user, along with associated performance metrics and other information about the adaptations. In particular, recommendation module 160 may suggest an adaptation to an employed model that is based on another implementation of the model when the difference value between the employed model and the implementation of the model surpasses a predetermined threshold. For example, recommendation module 160 may determine that an employed model and a particular implementation of the model are at least 12% different, as measured in terms of substantive differences. The difference value may be extracted from trusted sources that indicate a performance improvement. In some embodiments, difference values may be determined by performing an automatic run of the candidate framework change using test data to measure a difference in the execution speed of the models. If the threshold for a difference value is 10%, then recommendation module 160 may generate an adaptation of employed model that incorporates the identified differences of the other implementation of the model (and therefore the changes identified by source analysis module 145). In some embodiments, recommendation module 160 generates an adaptation for an employed data analysis model in response to an implementation of a model using a more recent version of an element of the model, such as an algorithm, module, library, etc.

Recommendation module 160 may present adaptations of models to a user in order to facilitate modifications of the user's employed model. Each adaptation may be presented along with an associated version and degree of differentiation from the user's currently-employed model. One or more adaptations may be presented to a user of user device 105 via a user interface, such as a dashboard display. In some embodiments, performance metrics for each adaptation are calculated and compared to the employed model's performance metrics. For example, each data analysis model may process a same set of sample data, and metrics may be gathered, such as the amount of time a model required to process the set of sample data, the accuracy of results, the amount of computing resources used to produce results, and the like. Each adaptation may be color-coded or otherwise provided with visual cues to indicate the relevance of an adaptation to the employed model. In some embodiments, recommendation module 160 may indicate one or more changes that are included in an implementation. Implementations may be tracked to identify which implementation produces a current optimized and/or recommended model by referencing the commit history of the implementation. In some embodiments, recommendation module 160 automatically modifies an employed model by incorporating adaptations into the model based on certain conditions, such as a version of a component of an adaptation being higher than a version of the same component in the employed model.

Storage 165 may include any non-volatile storage media known in the art. For example, storage 165 can be implemented with a tape library, optical library, one or more independent hard disk drives, or multiple hard disk drives in a redundant array of independent disks (RAID). Similarly, data in storage 165 may conform to any suitable storage architecture known in the art, such as a file, a relational database, an object-oriented database, and/or one or more tables. Storage 165 may store data relating to adapting models for analyzing data, including data analysis models, implementations of data analysis models, adaptations for data analysis models, model performance metrics, input data for data analysis models, data output by data analysis models, and the like.

Network 170 may include a local area network (LAN), a wide area network (WAN) such as the Internet, or a combination of the two, and includes wired, wireless, or fiber optic connections. In general, network 170 can be any combination of connections and protocols known in the art that will support communications between user device 105, data servers 125A-125N, and/or model adaptation server 135 via their respective network interfaces in accordance with embodiments of the present invention.

Figure 2:
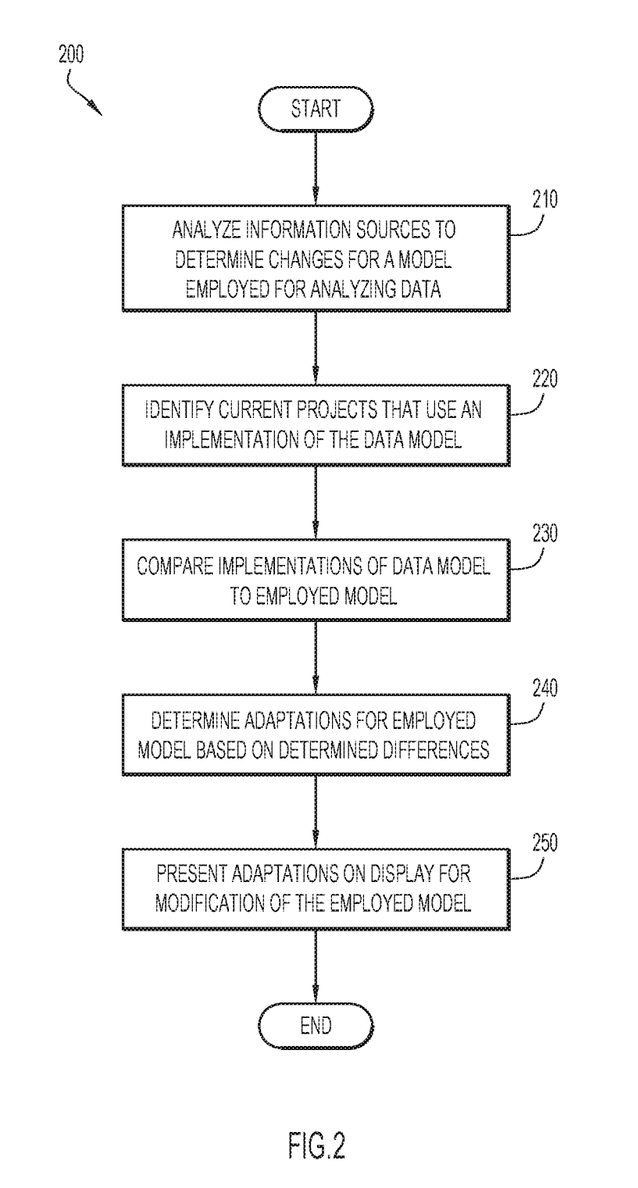
FIG. 2 is a flow chart depicting a method of applying an intelligent framework updater in accordance with an embodiment of the present invention.

FIG. 2 is a flow chart depicting a method 200 of applying an intelligent framework updater in accordance with an embodiment of the present invention.

Information sources are analyzed to determine changes for a model employed for analyzing data at operation 210. The model may perform any data analysis or processing tasks, and in some embodiments, the model is a statistical model. Source analysis module 145 may analyze one or more information sources, such as data servers 125A-125N, to identify changes for the employed model. The information sources may include research publications, open-source projects, webinars, blog posts, social media websites, version control systems, and the like. In some embodiments, source analysis module 145 analyzes information sources that have trust levels which surpass a particular threshold value. A trust level of an information source may be determined by an average user rating of the information source based on user feedback. In some embodiments, information sources are assigned trust levels, and each user or tenant in a multi-tenant environment may define an acceptable threshold value.

Source analysis module 145 may analyze a workflow of the employed model to identify keywords in the model's code and/or documentation, which can then be used as query terms to search the trusted information sources for changes for the employed model. In some embodiments, source analysis module 145 utilizes conventional or other natural language processing techniques, such as sentiment analysis, to select keywords. Using the keywords as query terms, source analysis module 145 identifies projects in information sources, such as source codes that are similar, but not identical to, the employed model's source code, that are associated with changes to the employed model (e.g., changes to functionality of the code, including granularity, layers, computation versions, inputs, outputs, etc.).

One or more current projects that use an implementation of the data model are identified at operation 220. Source analysis module 145 may identify projects having source code, documentation, and/or other data or metadata stored in, or referenced by, the projects having the changes identified at operation 210. Source analysis module 145 may receive data corresponding to the one or more current projects from one or more of data servers 125A-125N, and may store the data in storage 165.

The identified implementations are compared to the employed model at operation 230 to determine differences between the models. Comparison module 155 may compare source codes of any data analysis models in the identified implementations to the source code of the employed model to identify differences between the models. In some embodiments, comparison module 155 identifies only substantive differences between the models, such as features, functions, analysis techniques, inputs, outputs, and other variations not supported by, or included in, the employed model.

One or more adaptations for the employed data model are determined in response to determined differences between implementations of the data model and the data model itself satisfying a threshold at operation 240. The determined differences may be represented as a percentage value that is compared to a threshold value by recommendation module 160. Each adaptation may include a modification to the employed model that is based on one or more changes identified by source analysis module 145.

The one or more adaptations are presented for modification of the employed data model at operation 250. Adaptations may be presented to a user of user device 105 via application 120, which may provide a user interface that compares performance metrics of one or more adaptations to performance metrics of the user's existing model. In some embodiments, the changes that are extracted from information sources may be associated with a version and degree of differentiation from the employed model. Each adaptation may be linked to a commit history of the implementation upon which the adaptation is based. A user may indicate via application 120 whether the user would like to accept an adaptation to replace or use alongside the user's employed model.

Figure 3:
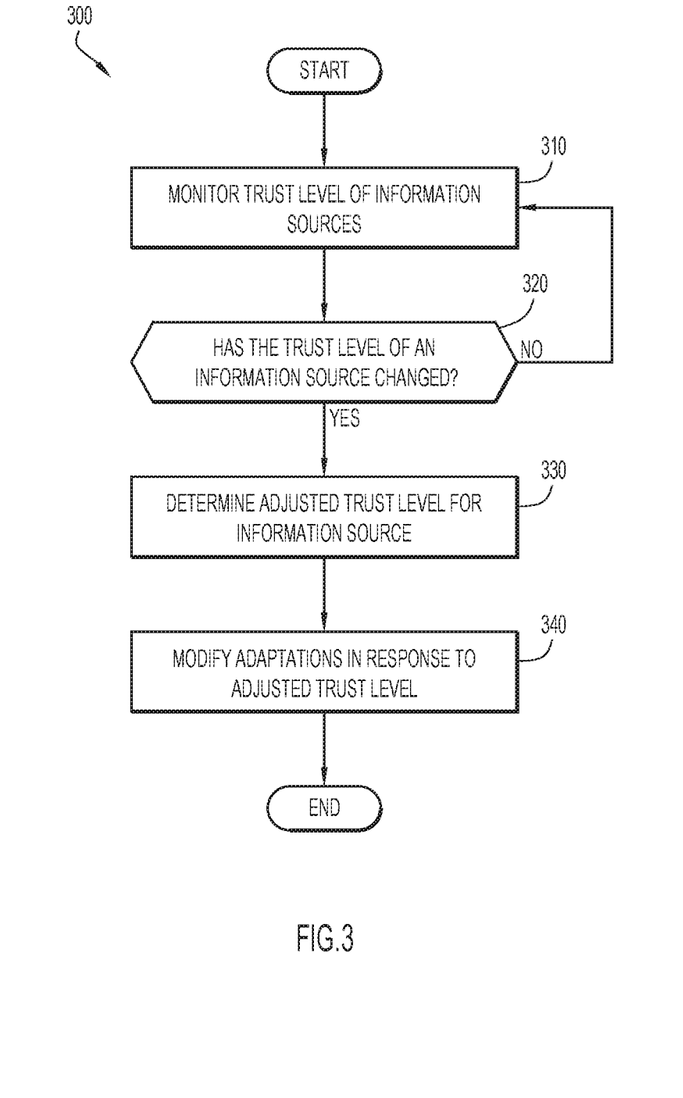
FIG. 3 is a flow chart depicting a method of modifying adaptations of models in response to changes in information source reputations in accordance with an embodiment of the present invention.

FIG. 3 is a flow chart depicting a method 300 of modifying adaptations of models in response to changes in information source reputations in accordance with an embodiment of the present invention.

Trust levels of one or more information sources are monitored at operation 310. Source analysis module 145 may monitor trust levels of information sources, such as data servers 125A-125N, over time. In some embodiments, trust levels are defined according to user reviews of the information sources. In other embodiments, trust values are predefined for one or more of the information sources.

Operation 320 determines whether the trust level of an information source has changed. If a trust level for an information source changes, method 300 proceeds to determine an adjusted trust level at operation 330; otherwise, source analysis module 145 continues to monitor trust levels of information sources for changes. Additionally or alternatively, the threshold trust level may be modified such that previously-trusted information sources no longer have a trust level that satisfies the threshold.

An adjusted trust level is determined for an information source at operation 330. The adjusted trust level may be calculated by source analysis module 145 by updating an information source's trust level in light of new user feedback (e.g., new or changed ratings, etc.), which may raise or lower the average trust level of the information source. In some embodiments, the trust level may manually be modified by a user.

Adaptations are modified in response to the adjusted trust level at operation 340. Any adaptations that depend on changes identified in an information source may be modified in the event that the information source is no longer deemed a trusted source. Adaptations may be modified by reverting the portion of the adaptation having the change to a previous state, such as the state of portion in the employed model. In some embodiments, an adaptation may be modified by removing the adaptation from being recommended. Thus, adaptations may be modified in response to any changes to a list of trusted sources.

Figure 4:
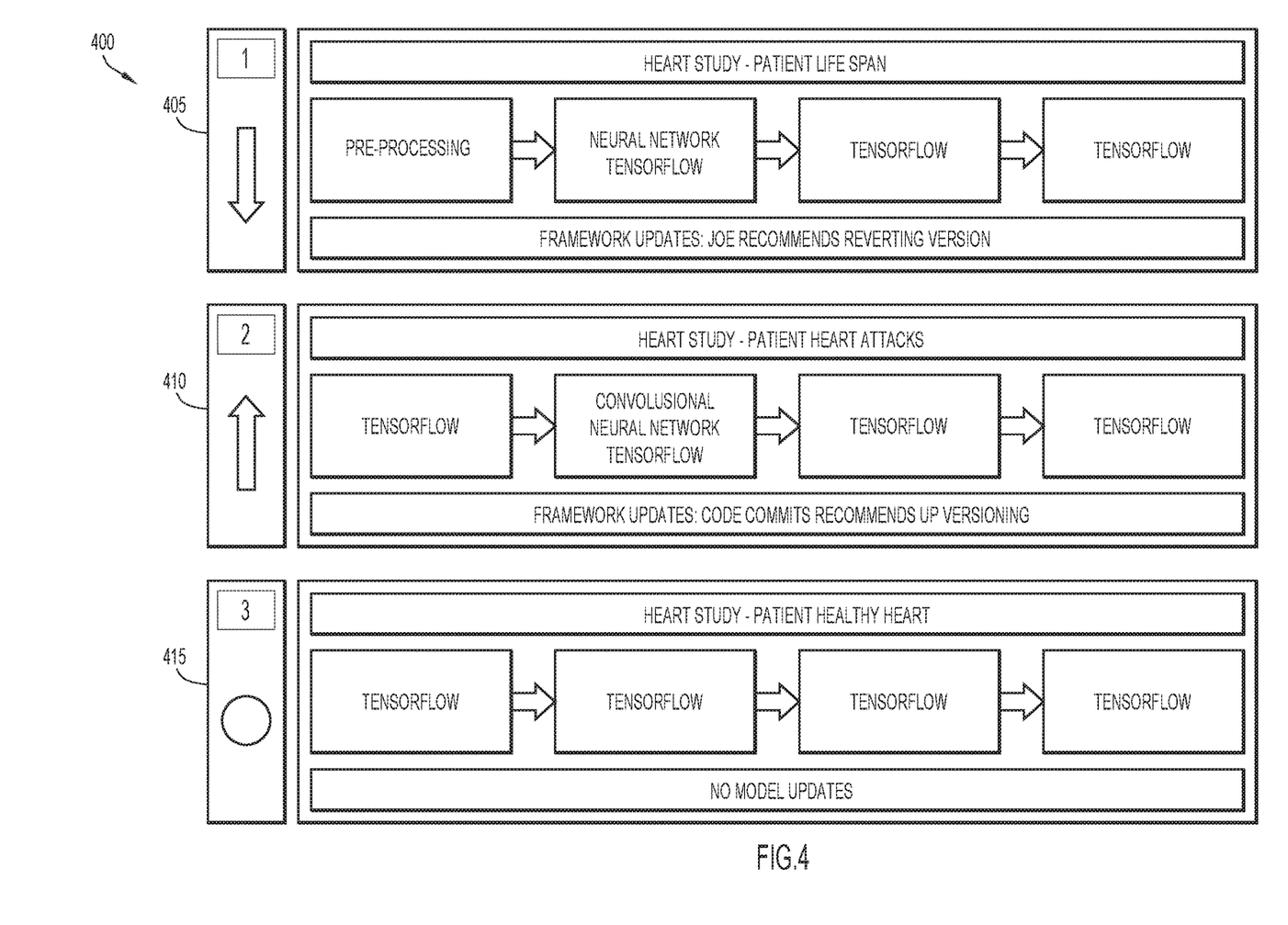
FIG. 4 is a block diagram depicting a user interface in accordance with an embodiment of the present invention.

FIG. 4 is a block diagram depicting a user interface 400 in accordance with an embodiment of the present invention. User interface 400 may comprise a dashboard display that is presented to a user of user device 105 via display 110. As depicted, user interface includes three adaptation windows 405, 410, and 415, representing adaptations for one or more data analysis models used in a project. In some embodiments, each adaptation is provided with a visual indication to distinguish recommended or relevant adaptations from other adaptations. For example, a recommended adaptation may be indicated in green, and a discouraged adaptation may be indicated in red. Arrows may also indicate recommended or discouraged changes to models, such as "up" arrows indicating a newer version or improvement to a model, and "down" arrows indicating an outdated change to a model. A "dot" or similar neutral symbol may indicate that a change is neutral and may not substantially increase or decrease performance of a model.

Each adaptation window includes a name, a depiction of modules for the data analysis model, and a recommendation, including a basis for the recommendation. For example, adaptation window 405 indicates that code for an employed model should be reverted to a previous version based on feedback from another user, whereas adaptation 410 indicates that a data analysis model should be upgraded, as a newer version has become available. Adaptation window 415 indicates that there are currently no changes for the associated data analysis model.

Figure 5:
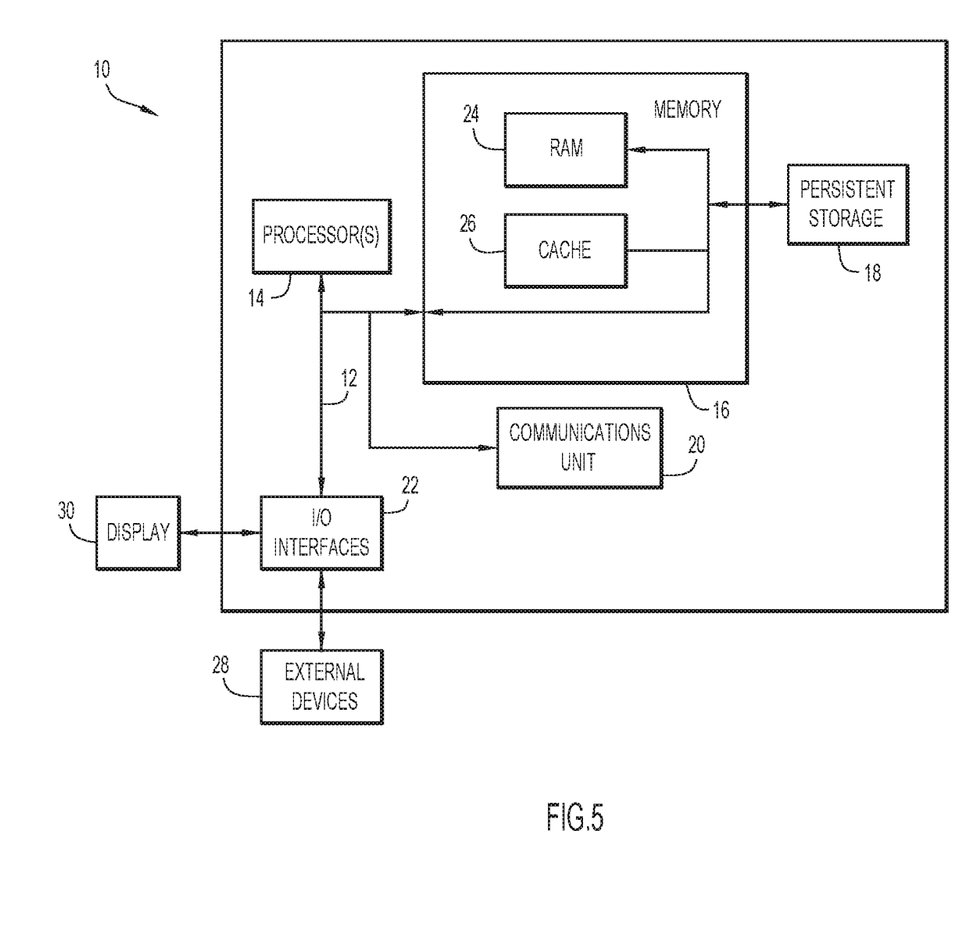
FIG. 5 is a block diagram depicting a computing device in accordance with an embodiment of the present invention.

FIG. 5 is a block diagram depicting components of a computer 10 suitable for executing the methods disclosed herein. Computer 10 may implement user devices 105, data server 125, and/or model adaptation server 135 in accordance with embodiments of the present invention. It should be appreciated that FIG. 5 provides only an illustration of one embodiment and does not imply any limitations with regard to the environments in which different embodiments may be implemented. Many modifications to the depicted environment may be made.

As depicted, the computer 10 includes communications fabric 12, which provides communications between computer processor(s) 14, memory 16, persistent storage 18, communications unit 20, and input/output (I/O) interface(s) 22. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Memory 16 and persistent storage 18 are computer readable storage media. In the depicted embodiment, memory 16 includes random access memory (RAM) 24 and cache memory 26. In general, memory 16 can include any suitable volatile or non-volatile computer readable storage media.

One or more programs may be stored in persistent storage 18 for execution by one or more of the respective computer processors 14 via one or more memories of memory 16. The persistent storage 18 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Communications unit 20, in these examples, provides for communications with other data processing systems or devices. In these examples, communications unit 20 includes one or more network interface cards. Communications unit 20 may provide communications through the use of either or both physical and wireless communications links.

I/O interface(s) 22 allows for input and output of data with other devices that may be connected to computer 10. For example, I/O interface 22 may provide a connection to external devices 28 such as a keyboard, keypad, a touch screen, and/or some other suitable input device. External devices 28 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 18 via I/O interface(s) 22. I/O interface(s) 22 may also connect to a display 30. Display 30 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Data relating to adapting data analysis models (e.g., model information, information source reputation information, change information, adaptation information, input data for analysis models, etc.) may be stored within any conventional or other data structures (e.g., files, arrays, lists, stacks, queues, records, etc.) and may be stored in any desired storage unit (e.g., database, data or other repositories, queue, etc.). The data transmitted between user device 105, data servers 125A-125N, and/or model adaptation server 135 may include any desired format and arrangement, and may include any quantity of any types of fields of any size to store the data. The definition and data model for any datasets may indicate the overall structure in any desired fashion (e.g., computer-related languages, graphical representation, listing, etc.).

Data relating to adapting data analysis models (e.g., model information, information source reputation information, change information, adaptation information, input data for analysis models, etc.) may include any information provided to, or generated by, user device 105, data servers 125A-125N, and/or model adaptation server 135. Data relating to adapting data analysis models may include any desired format and arrangement, and may include any quantity of any types of fields of any size to store any desired data. The data relating to adapting data analysis models may include any data collected about entities by any collection mechanism, any combination of collected information, and any information derived from analyzing collected information.

The present invention embodiments may employ any number of any type of user interface (e.g., Graphical User Interface (GUI), command-line, prompt, etc.) for obtaining or providing information (e.g., data relating to adapting data analysis models), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

It will be appreciated that the embodiments described above and illustrated in the drawings represent only a few of the many ways of providing an intelligent framework update that incorporates framework changes into data analysis models.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., communications software, server software, application 120, source analysis module 145, comparison module 155, recommendation module 160, etc.). These systems may include any types of monitors and input devices (e.g., keyboard, mouse, voice recognition, etc.) to enter and/or view information.

It is to be understood that the software (e.g., communications software, server software, application 120, source analysis module 145, comparison module 155, recommendation module 160, etc.) of the present invention embodiments may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., communications software, server software, application 120, source analysis module 145, comparison module 155, recommendation module 160, etc.) may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., data relating to adapting data analysis models). The database system may be implemented by any number of any conventional or other databases, data stores or storage structures (e.g., files, databases, data structures, data or other repositories, etc.) to store information (e.g., data relating to adapting data analysis models). The database system may be included within or coupled to the server and/or client systems. The database systems and/or storage structures may be remote from or local to the computer or other processing systems, and may store any desired data (e.g., data relating to adapting data analysis models).

The present invention embodiments may employ any number of any type of user interface (e.g., Graphical User Interface (GUI), command-line, prompt, etc.) for obtaining or providing information (e.g., data relating to adapting data analysis models), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for any number of applications in the relevant fields, including, but not limited to, automatically analyzing and updating any computerized model based on any identifiable and compatible changes to the model.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method of adapting a model analyzing data comprising:
   analyzing, via a processor, information sources to determine one or more changes for a computerized model employed for analyzing data;
   identifying, via the processor, one or more current projects each using an implementation of the computerized model with at least one of the determined changes;
   comparing, via the processor, the implementations of the computerized model to the employed computerized model to determine differences;
   determining, via the processor, one or more adaptations for the employed computerized model in response to the determined differences for a corresponding implementation of the computerized model satisfying a threshold, wherein the one or more adaptations for the employed computerized model are based on the determined changes in the corresponding implementation of the computerized model, and wherein the information sources are associated with a trust level, and the one or more adaptations are modified in response to adjustment of the trust level for an information source; and
   installing, via the processor, at least one adaption into a platform hosting the employed computerized model for modification of the employed computerized model.

2. The computer-implemented method of claim 1, further comprising:
   selecting, via the processor, the information sources to analyze based on keywords from a workflow for the employed computerized model.

3. The computer-implemented method of claim 1, further comprising:
   tracing, via the processor, each of the implementations of the computerized model with different ones of the determined changes.

4. The computer-implemented method of claim 1, wherein the information sources include one or more from a group of: research publications, open-source projects, webinars, presentations, blog posts, and social media sites.

5. The computer-implemented method of claim 1, further comprising:
   extracting, via the processor, the one or more changes from the information sources and associating the one or more changes with a version and degree of differentiation of the corresponding implementation of the computerized model from the employed computerized model.

6. The computer-implemented method of claim 1, further comprising:
   linking, via the processor, each adaptation incorporated into the employed computerized model with a commit history.

7. The computer-implemented method of claim 1, wherein the employed computerized model includes a statistical model.

8. A computer system for adapting a model analyzing data, the computer system comprising:
   one or more computer processors;
   one or more computer readable storage media;
   program instructions stored on the one or more computer readable storage media for execution by at least one of the one or more computer processors, the program instructions comprising instructions to:
      analyze information sources to determine one or more changes for a computerized model employed for analyzing data;
      identify one or more current projects each using an implementation of the computerized model with at least one of the determined changes;
      compare the implementations of the computerized model to the employed computerized model to determine differences;
      determine one or more adaptations for the employed computerized model in response to the determined differences for a corresponding implementation of the computerized model satisfying a threshold, wherein the one or more adaptations for the employed computerized model are based on the determined changes in the corresponding implementation of the computerized model, and wherein the information sources are associated with a trust level, and the one or more adaptations are modified in response to adjustment of the trust level for an information source; and
      install at least one adaption into a platform hosting the employed computerized model for modification of the employed computerized model.

9. The computer system of claim 8, wherein the program instructions further comprise instructions to:
   select the information sources to analyze based on keywords from a workflow for the employed computerized model.

10. The computer system of claim 8, wherein the program instructions further comprise instructions to:

trace each of the implementations of the computerized model with different ones of the determined changes.

11. The computer system of claim 8, wherein the information sources include one or more from a group of: research publications, open-source projects, webinars, presentations, blog posts, and social media sites.

12. The computer system of claim 8, wherein the program instructions further comprise instructions to:
extract the one or more changes from the information sources and associate the one or more changes with a version and degree of differentiation of the corresponding implementation of the computerized model from the employed computerized model.

13. A computer program product for adapting a model analyzing data, the computer program product comprising one or more computer readable storage media collectively having program instructions embodied therewith, the program instructions executable by a computer to cause the computer to:
analyze information sources to determine one or more changes for a computerized model employed for analyzing data;
identify one or more current projects each using an implementation of the computerized model with at least one of the determined changes;
compare the implementations of the computerized model to the employed computerized model to determine differences;
determine one or more adaptations for the employed computerized model in response to the determined differences for a corresponding implementation of the computerized model satisfying a threshold, wherein the one or more adaptations for the employed computerized model are based on the determined changes in the corresponding implementation of the computerized model, and wherein the information sources are associated with a trust level, and the one or more adaptations are modified in response to adjustment of the trust level for an information source; and
install at least one adaption into a platform hosting the employed computerized model for modification of the employed computerized model.

14. The computer program product of claim 13, wherein the program instructions further cause the computer to:
select the information sources to analyze based on keywords from a workflow for the employed computerized model.

15. The computer program product of claim 13, wherein the program instructions further cause the computer to:
trace each of the implementations of the computerized model with different ones of the determined changes.

16. The computer program product of claim 13, wherein the information sources include one or more from a group of: research publications, open-source projects, webinars, presentations, blog posts, and social media sites.

17. The computer program product of claim 13, wherein the program instructions further cause the computer to:
extract the one or more changes from the information sources and associate the one or more changes with a version and degree of differentiation of the corresponding implementation of the computerized model from the employed computerized model.

* * * * *